United States Patent [19]

Kazemzadeh

[11] Patent Number: 5,642,414
[45] Date of Patent: Jun. 24, 1997

[54] METHOD AND APPARATUS FOR AUTOMATIC GENERATION OF TELEPHONE CALL BLOCKING SIGNALS

[76] Inventor: Fardad Kazemzadeh, 10823 Rock Run Dr., Potomac, Md. 20854

[21] Appl. No.: 443,150

[22] Filed: May 17, 1995

[51] Int. Cl.[6] .................................................. H04M 1/26
[52] U.S. Cl. ..................... 379/377; 379/216; 379/355
[58] Field of Search ........................... 379/142, 216, 379/114, 354, 355, 212, 201, 88, 221, 245, 112, 196, 188, 82, 199, 382, 383, 373, 96

[56] References Cited

U.S. PATENT DOCUMENTS

| | | | |
|---|---|---|---|
| 4,661,976 | 4/1987 | Basch | 379/355 |
| 4,751,728 | 6/1988 | Treat | 379/114 |
| 4,873,720 | 10/1989 | Son | 379/216 |
| 4,887,294 | 12/1989 | Ruey-Guang | 379/216 |
| 4,964,159 | 10/1990 | Son | 379/216 |
| 5,031,212 | 7/1991 | Saji et al. | 379/355 |
| 5,134,653 | 7/1992 | Satomi et al. | 379/354 |
| 5,161,181 | 11/1992 | Zwick | 379/142 |
| 5,309,508 | 5/1994 | Rosen | 379/142 |
| 5,365,577 | 11/1994 | Davis et al. | 379/96 |
| 5,426,693 | 6/1995 | Rosen | 379/142 |
| 5,455,858 | 10/1995 | Lin | 379/355 |
| 5,495,525 | 2/1996 | Walker et al. | 379/216 |

*Primary Examiner*—Krista M. Zele
*Assistant Examiner*—Scott Wolinsky
*Attorney, Agent, or Firm*—Lalos & Keegan

[57] ABSTRACT

A method and apparatus for generating a telephone Call Blocking Code and outputting the telephone Call Blocking Code on a telephone line each time a telephone off-hook condition is detected or, alternatively, by pressing the first digit of the telephone number to be called. This provides an All Blocking feature for the telephone by automatically generating a blocking code signal before every outgoing call from the telephone.

28 Claims, 2 Drawing Sheets

METHOD AND APPARATUS FOR AUTOMATIC GENERATION OF TELEPHONE CALL BLOCKING SIGNALS

FIELD OF THE INVENTION

The present invention is related to telephone systems and more particularly to optional telephone features available to the general consumer.

BACKGROUND OF THE INVENTION

The telephone companies now offer a variety of options to the public. These include Call Forwarding, Call Waiting, Call Back, and others. One of the features now available is Caller I.D. This is a service that allows a subscriber to obtain information about the calling party, specifically the caller's telephone number and in some instances the caller's name.

An issue that has arisen from this service is protection of the privacy of the calling party. There are many instances where the calling party does not necessarily want their name and phone number revealed. For example, when calling a toll-free 800 number of a store or service, a person does not always want the store or service to automatically receive the person's name and phone number. This information is often fed into a computer database and is used for mass solicitations.

To address this privacy concern, the telephone companies now offer a feature known as Per Call Blocking. In order to implement this feature, the caller must enter a blocking code before dialing the number of the party being called. For example, in the Bell Atlantic calling area the code *67 must be entered on a touch tone phone prior to entering the phone number. This feature is limited to a single call and must be reentered for each subsequent call. There is no provision for blocking all calls made from a telephone subscriber's line.

SUMMARY OF THE INVENTION

The present invention overcomes the disadvantage of the Per Call Blocking feature by automatically generating a blocking code each time a call is made on the telephone subscriber's line. An appropriate call blocking code is stored in a memory connected to the telephone subscriber's line. In one embodiment, each time the telephone handset is picked up, the blocking code (e.g. *67) is output from the memory and transmitted on the line. In a second embodiment, for each new telephone dialing sequence, when the first key in the sequence is pressed on the telephone push-button pad, the blocking code is output from memory and transmitted on the line prior to the first key. Then the telephone number being called is transmitted on the telephone line. Thus, automatically, the caller's i.d. (i.e. phone number and name) are restricted from the called party, even if that party has the Caller I.D. feature.

The present invention also includes a disable feature in the first embodiment that prevents the call blocking code from being output from the memory. A ring detector is connected to the subscriber's line to determine if a call is incoming. If the ring detector detects an incoming call it generates a memory disable signal to prevent the memory from outputting the blocking code. This memory disable signal remains in effect for a fixed time period. Typically, rings are spaced approximately 5 seconds apart. Therefore, in the present invention the memory disable remains in effect for more than 5 seconds (e.g. 6 seconds) after each ring is detected. Thus, if the phone rings and the handset is picked up to receive the call, the blocking code will not be transmitted on the line. The blocking code will be transmitted for outgoing calls only.

DETAILED DESCRIPTION

Figure 1:
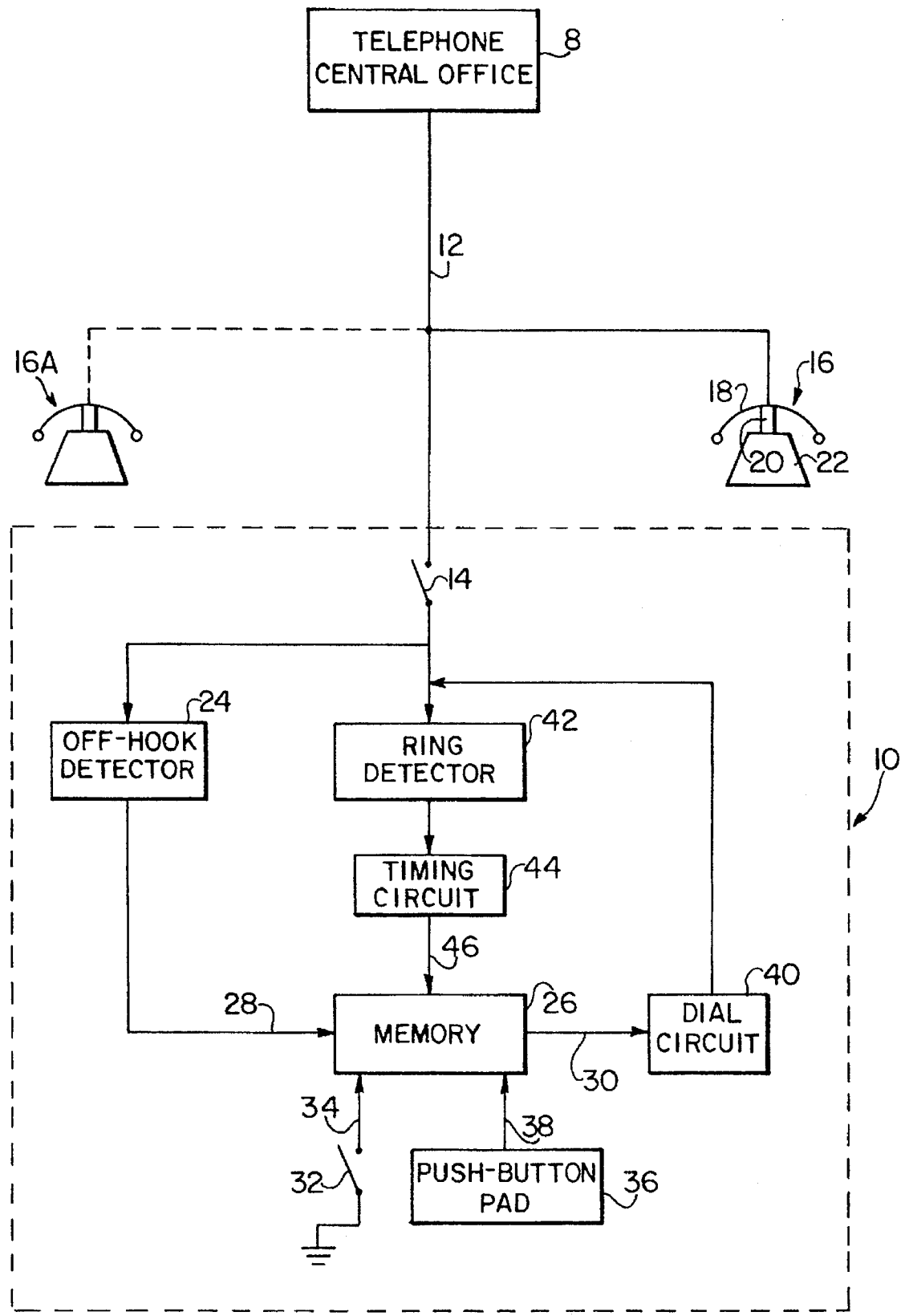
FIG. 1 is a diagrammatic illustration of a first embodiment of the apparatus of the present invention.

The Call Blocking Apparatus of the present invention is shown generally in FIG. 1 as circuit 10. Circuit 10 is connected to the telephone line 12 through bypass switch 14, which allows circuit 10 to be deactivated when the telephone user does not want the call blocking feature to be operational. The telephone line 12 is connected to a local switching office or central office 8, in the conventional manner.

Connected to the telephone line 12 and in parallel to circuit 10 is telephone set 16 and optional telephone set 16A. Of course any number of optional telephone sets 16A can be connected to the telephone line 12 in a household, for example. Each telephone set, which is conventional, will include, generally, a telephone handset 18 (with receiver and transmitter), a switch hook 20, and body 22 that includes the ringer, frequency generator circuit, e.t.c. The switch hook 20 connects the telephone set circuit to the telephone line when the handset is off the hook and opens the connection when the handset is on the hook. The off-hook position places a dc closure on a loop circuit, typically. In telephone sets that have a "hands-free" capability, this function is performed electronically rather than through mechanical activation of a switch.

In the circuit 10 of the present invention, the "off-hook" position is detected by off-hook detection circuit 24, which may be any conventional circuit for detecting that a telephone set 16 or 16A is connected to the telephone line 12 (through mechanical or electrical/electronic switch activation). Detection circuit 24 is connected to memory 26, and specifically to the memory's read-enable line 28. If the off-hook position or condition is detected, the read enable line 28 is activated, thereby causing the contents of memory 26 to be output on data-out lines 30. As is conventional, the memory contents are output only on transitions (e.g. from low to high) on the read enable line. Therefore, the memory contents will be read out once, for a brief period, and then not again until a "new" off-hook condition is detected, i.e. until after the handset 18 (or its electronic equivalent) is put back on the switch hook and then removed again.

Memory 26 stores the blocking code appropriate for the regional calling area, e.g. *67 in the Bell Atlantic calling area. This code is input into memory 26 through activation of switch 32 that is connected to the write enable line 34 of memory 26. When switch 32 is in the closed position, the user enters the blocking code on push-button keypad 36 which inputs the code into memory 26 on data-in lines 38. This allows a new code to be input if the user moves to a new calling area or if the phone company changes the code for Call Blocking.

As discussed previously, when the off-hook position or condition is detected by detector 24, the memory contents, i.e. the blocking code, are read out on data-out lines 30. These lines are connected to a two-frequency touch-tone dial circuit 40 that generates the touch tones which are transmitted on the telephone line 12. Memory 26, e.g. a random access memory (RAM), and dial circuit 40 may be conventional, such as those used in phones with a speed dialing capability.

With circuit 10 of the present invention connected to the telephone line 12, in parallel with one or more telephone sets 16,16A, each time the handset 18 is picked up (or the electronic equivalent in a hands-free phone) the blocking code is automatically dialed. This eliminates the need for the user to manually input the code each time he or she makes a call, as is presently required.

A telephone user does not need or want the blocking code to be generated when he or she is receiving a call. To obviate this problem, ring detector 42 is connected to telephone line 12. Detector 42, which may be conventional, is connected to a conventional timing circuit 44. When ring detector 42 detects a ring signal on phone line 12, it activates timing circuit 44, which generates a memory disable signal on line 46. This condition prevents data from being read out from memory 26 when the handset is picked up to answer the incoming call. Typically, rings are spaced about 5 seconds apart. The timing circuit is set to maintain the memory disable signal for more than 5 seconds (e.g. 6 seconds). If a ring is not detected within 6 seconds, for example, then the disable signal is terminated and memory 26 is enabled.

Circuit 10 of the present invention may stand alone or be physically incorporated in a telephone set 16,16A. In the latter case, any of the phone's standard components may be used. These may include an off-hook detector, ring detector, memory, dial circuit, and push buttons. Thus, the present invention may be implemented at minor cost.

Figure 2:
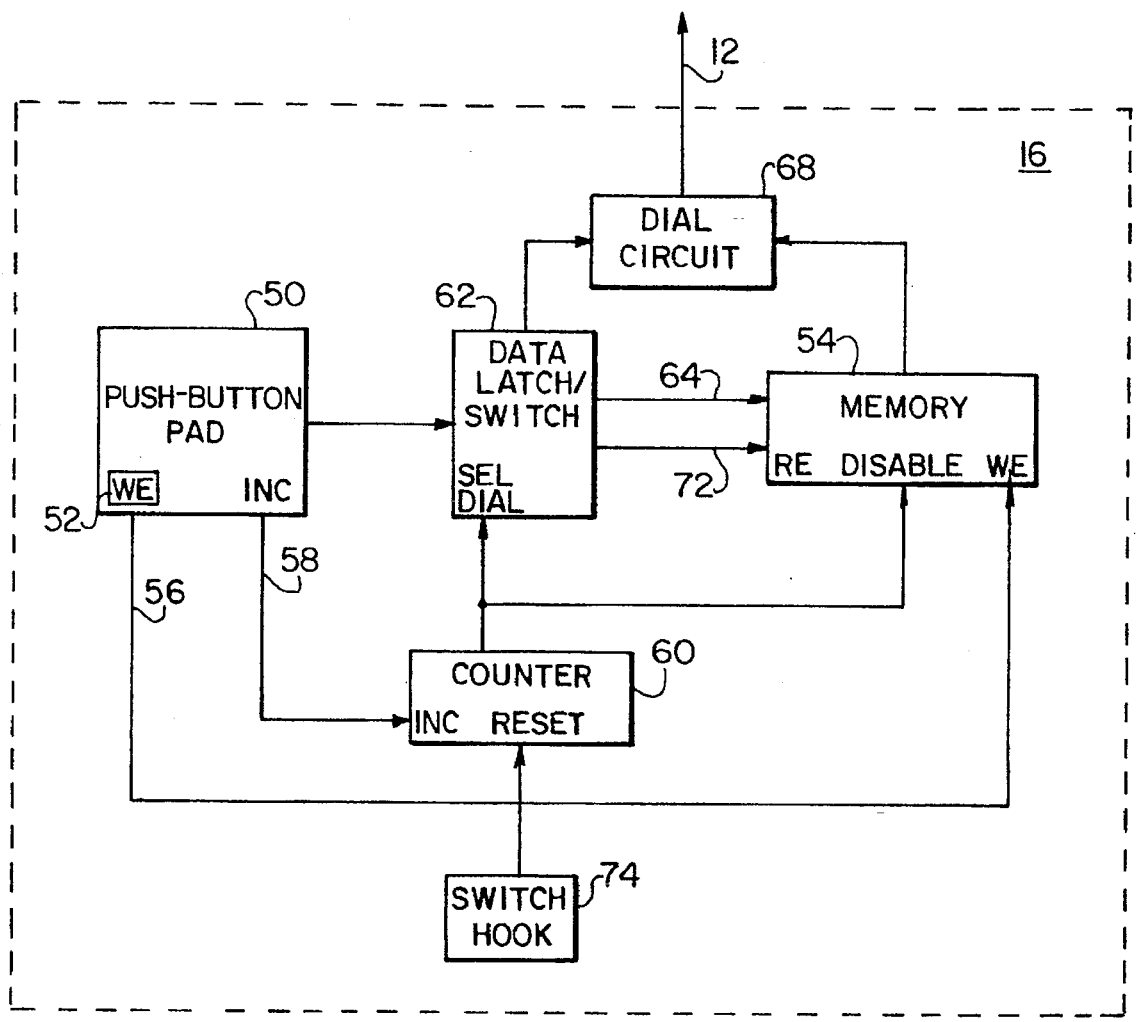
FIG. 2 is a diagrammatic illustration of a second embodiment of the apparatus of the present invention.

In a second embodiment of the present invention, the All Call Blocking feature is incorporated into a telephone set 16. FIG. 2 illustrates a telephone set 16 with the second embodiment of the present invention, with only the pertinent features of the telephone set being shown. In this embodiment, the telephone push-button pad 50 is provided with a key or switch 52, which when activated, enables the write enable line 56 of memory 54. At the time of telephone installation, switch 52 is activated and the blocking code (e.g. *67) is entered on pad 50 and stored in memory 54 via data latch/switch 62 and data-in lines 64. Activating switch 52 also disables the pad's counter increment line 58, which prevents the counter 60 from being incremented from zero when keys are pressed on pad 50. When counter 60 is set to zero, data latch/switch 62 is set to route signals corresponding to keys pressed on pad 50 to memory 54 rather than to dial circuit 68.

In operation, counter 60 is initially set to zero and the memory disable line 70 is inactive. When the telephone user first presses a key on push-button pad 50, the data corresponding to that key is latched in data latch/switch 62 and the memory read enable line 72 is activated causing the blocking code to be output to dial circuit 68. When the push-button key is released, the data corresponding to the key is output from data latch/switch 62 to dial circuit 68, and counter 60 is incremented. Incrementing counter 60 from its initial zero value to a non-zero value activates memory disable line 70, and sets data latch/switch 62 so that signals corresponding to subsequent keys pressed on the push-button pad 50 are routed to dial circuit 68. Counter 60 can be reset to zero when, for example, switch hook 74 is set back to its "on-hook" position, i.e. user "hangs up".

In operation, when the telephone user presses the first digit of the telephone number he or she is dialing, that digit is latched in data latch/switch 62 and the blocking code stored in memory 54 is read out to dial circuit 68. Dial circuit 68 is a conventional two-frequency touch-tone circuit that generates the touch-tones which are transmitted on the telephone line 12. When the user releases the key corresponding to that first digit, the first digit data latched in data latch/switch 62 is output to dial circuit 68, counter 60 is incremented and memory 54 is disabled. Subsequent digits of the phone number entered by the user are routed to dial circuit 68, which transmits the corresponding touch tones on telephone line 12. Thus, each time the user makes a call, the blocking code is transmitted prior to the telephone number.

The present invention effectively gives the user an All Call Blocking feature not presently available from the phone companies. Rather than physically entering the blocking code prior to making each call, the present invention dials the code automatically, enabling the user to simply dial the number of the called party.

The present invention has been described in terms of preferred embodiments. However, numerous variations and changes will occur to those having ordinary skill in the art. It is intended that all such variations and changes be within the scope of the present invention as limited solely by the following claims.

I claim:

1. An apparatus for controlling the generation of a telephone call blocking signal on a telephone line comprising:
   a memory for storing a call blocking code and for outputting said code in response to activation of a memory read enable line;
   a means for automatically activating said memory read enable line to cause said call blocking code to be output from said memory;
   a first signal generating means connected to said memory means and to said telephone line for generating a call blocking code signal on said telephone line in response to said call blocking code output from said memory;
   a ring detecting means connected to said telephone line for detecting a ring signal; and
   a second signal generating means connected to said ring detecting means for generating a memory disable signal when said ring signal is detected, whereby said call blocking code is prevented from being generated when said ring signal is detected on said telephone line.

2. An apparatus as in claim 1 wherein said means for automatically activating said memory read enable line includes an off-hook condition detecting means.

3. An apparatus as in claim 2 further including a switch connected to said telephone line for alternately connecting and disconnecting at least said off-hook condition detecting means from said telephone line.

4. An apparatus as in claim 1 wherein said second signal generating means includes a timing means for maintaining said memory disable signal for a predetermined time period.

5. An apparatus as in claim 1 further including an input means connected to said memory for inputting said call blocking code into said memory.

6. An apparatus as in claim 1 wherein said means for automatically activating said memory read enable line includes a telephone push-button pad.

7. An apparatus as in claim 6 further including a means for disabling said memory after said memory read enable line has been activated.

8. An apparatus as in claim 7 wherein said means for disabling said memory includes a counter connected to said push-button pad and to said memory.

9. An apparatus as in claim 8 wherein said push-button pad includes a means for incrementing said counter in response to activation of a key on said push-button pad.

10. An apparatus as in claim 9 further including a means for resetting said counter.

11. An apparatus as in claim 10 wherein said means for resetting said counter includes a telephone switch hook.

12. A method for controlling the generation of a telephone call blocking signal on a telephone line comprising the steps of:

storing a call blocking code in a memory;

if a ring signal is detected on said telephone line, generating a memory disable signal;

if an off-hook condition is detected on said telephone line, activating a memory read enable line;

outputting said call blocking code from said memory in response to activation of said memory read enable line; and generating a call blocking signal on said telephone line in response to said call blocking code output from said memory.

13. A method as in claim 12 wherein said step of activating said memory read enable line includes detecting a telephone off-hook condition.

14. A method as in claim 12 wherein said memory disable signal is maintained for a predetermined time period.

15. A method as in claim 12 wherein said step of activating said memory read enable line includes pressing a key on a telephone push-button pad, wherein said key represents the first digit of a telephone number to be called.

16. A method as in claim 15 further including the step of generating a signal on said telephone line corresponding to said first digit, after said step of generating said call blocking signal.

17. A method as in claim 15 further including the step of incrementing a counter in response to pressing said key on said push-button pad.

18. A method as in claim 17 further including the step of generating a memory disable signal after said step of incrementing said counter.

19. A method as in claim 18 further including the step of resetting said counter by setting a telephone switch hook in an on-hook position.

20. An apparatus for automatically generating a telephone call blocking signal on a telephone line for calls made from a telephone comprising:

a memory for storing a call blocking code and for outputting said code in response to activation of a memory read enable line;

a means including a telephone push-button pad for automatically activating said memory read enable line to cause said call blocking code to be output from said memory;

a first signal generating means connected to said memory means and to said telephone line for generating a call blocking code signal on said telephone line in response to said call blocking code output from said memory; and a means for disabling said memory after said memory read enable line has been activated.

21. An apparatus as in claim 20 wherein said means for disabling said memory includes a counter connected to said push-button pad and to said memory.

22. An apparatus as in claim 21 wherein said push-button pad includes a means for incrementing said counter in response to activation of a key on said push-button pad.

23. An apparatus as in claim 22 further including a means for resetting said counter.

24. An apparatus as in claim 23 wherein said means for resetting said counter includes a telephone switch hook.

25. A method for automatically generating a telephone call blocking signal on a telephone line for calls made from a telephone comprising the steps of:

storing a call blocking code in a memory;

activating a memory read enable line by pressing a key on a telephone push-button pad, said key representing the first digit of a telephone number to be called;

outputting said call blocking code from said memory in response to activation of said memory read enable line:

generating a call blocking signal on said telephone line in response to said call blocking code output from said memory;

generating a memory disable signal; and generating a signal on said telephone line corresponding to said first digit.

26. A method as in claim 25 further including the step of incrementing a counter in response to pressing said key on said push-button pad.

27. A method as in claim 26 further including the step of generating a memory disable signal after said step of incrementing said counter.

28. A method as in claim 27 further including the step of resetting said counter by setting a telephone switch hook in an on-hook position.

\* \* \* \* \*